(12) United States Patent
Zhao et al.

(10) Patent No.: US 10,045,013 B2
(45) Date of Patent: Aug. 7, 2018

(54) PIXEL ARRAY, DISPLAY DEVICE AND DISPLAY METHOD

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenqing Zhao, Beijing (CN); Xue Dong, Beijing (CN); Xiaochuan Chen, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 14/914,412

(22) PCT Filed: Sep. 11, 2015

(86) PCT No.: PCT/CN2015/089422
§ 371 (c)(1),
(2) Date: Feb. 25, 2016

(87) PCT Pub. No.: WO2016/123978
PCT Pub. Date: Aug. 11, 2016

(65) Prior Publication Data
US 2016/0234488 A1 Aug. 11, 2016

(30) Foreign Application Priority Data
Feb. 6, 2015 (CN) .......................... 2015 1 0065304

(51) Int. Cl.
*G02F 1/1335* (2006.01)
*H04N 13/04* (2006.01)

(52) U.S. Cl.
CPC ..... *H04N 13/0497* (2013.01); *H04N 13/0402* (2013.01); *H04N 13/0415* (2013.01);
(Continued)

(58) Field of Classification Search
CPC ........... H04N 13/0497; H04N 13/0402; H04N 13/0415
(Continued)

(56) References Cited

U.S. PATENT DOCUMENTS

| 2012/0086708 A1 | 4/2012 | Lin et al. |
| 2014/0063378 A1* | 3/2014 | Sumi .................. G02B 27/2214 349/15 |

FOREIGN PATENT DOCUMENTS

| CN | 102469331 A | 5/2012 |
| CN | 102577405 A | 7/2012 |

(Continued)

OTHER PUBLICATIONS

Search Report and Written Opinion dated Dec. 1, 2015 from State Intellectual Property Office of the P.R. China.
Chinese Office Action dated Jun. 20, 2016.

*Primary Examiner* — Lucy Chien
(74) *Attorney, Agent, or Firm* — Dilworth & Barrese, LLP; Michael J. Musella, Esq.

(57) ABSTRACT

A pixel array, a display device and a display method are provided. The pixel array comprises a plurality of pixel rows, each pixel row includes repetitive units sequentially arranged along a row direction, and each repetitive unit includes three sub-pixels of different colors (B, R and G). Odd-numbered pixel rows and even-numbered pixel rows are alternately arranged along a column direction; in an odd-numbered pixel row and an even-numbered pixel row adjacent to each other, a minimum distance between center points of sub-pixels of a same color along the row direction is equal to 1 to 1.5 times a width of the sub-pixel, and the
(Continued)

width of the sub-pixel is a size of the sub-pixel along the row direction. The pixel array, the display device and the display method can achieve a high resolution by 2D pixel rendering; and in a 3D mode, 3D optical crosstalk can be mitigated by increasing a buffer sub-pixel.

19 Claims, 6 Drawing Sheets

(52) U.S. Cl.
CPC ..... *H04N 13/0422* (2013.01); *H04N 13/0454* (2013.01); *H04N 13/0459* (2013.01); *H04N 13/0484* (2013.01)

(58) Field of Classification Search
USPC .......................................................... 349/15
See application file for complete search history.

(56) References Cited

FOREIGN PATENT DOCUMENTS

| | | | |
|---|---|---|---|
| CN | 102595180 | A | 7/2012 |
| CN | 102681244 | A | 9/2012 |
| CN | 102692720 | A | 9/2012 |
| CN | 103185995 | A | 7/2013 |
| CN | 103969836 | A | 8/2014 |
| CN | 104614863 | A | 5/2015 |
| TW | 201028734 | A | 8/2010 |

* cited by examiner

PIXEL ARRAY, DISPLAY DEVICE AND DISPLAY METHOD

TECHNICAL FIELD

Embodiments of the present disclosure relate to a pixel array, a display device and a display method.

BACKGROUND

In recent years, a three-dimensional display technology is paid more and more attention, and a basic principle thereof is to enable a person's left and right eyes to respectively receive different pictures, and then the brain superimposes and regenerates image information so as to implement a three-dimensional effect.

The three-dimensional display technology is mainly divided into two implementation modes: a glassless type and a glass type, wherein, a glass-type three-dimensional display technology needs special glasses to be worn, which is inconvenient to carry, so the glassless-type three-dimensional display technology is more advantageous. Currently, a implementation mode of the glassless-type three-dimensional display is mainly to arrange a light splitting device, so that light for displaying a left-eye image and light for displaying a right-eye image respectively enter the left and right eyes of the viewer, for example, the light splitting device mainly include a parallax barrier or a lenticular lens.

With rapid development of the three-dimensional display technology, such technology is also rapidly applied to a mobile handheld product. In a parallax barrier technology, parallel light shielding bars form discrete ultra-thin bright lines behind a display screen, these bright lines are separated by a certain distance, the left eye of the viewer can see bright lines through even-numbered pixel columns of a liquid crystal display screen, while the right eye of the viewer cannot see the bright lines through the even-numbered pixel columns of the display screen, and vice versa. Thus, the left eye of the viewer can only see an image displayed by the even-numbered pixel columns of the display screen, while the right eye can only see an image displayed by odd-numbered pixel columns of the display screen, so that the viewer will be able to receive parallax stereo image pairs to produce depth perception.

SUMMARY

According to some embodiments of the present disclosure, there is provided a pixel array, comprising a plurality of pixel rows, each pixel row including repetitive units sequentially arranged along a row direction, and each repetitive unit including three sub-pixels of different colors, wherein, odd-numbered pixel rows and even-numbered pixel rows are alternately arranged along a column direction;

in an odd-numbered pixel row and an even-numbered pixel row adjacent to each other, a minimum distance between center points of sub-pixels of a same color along the row direction is equal to 1 to 1.5 times a width of the sub-pixel, and the width of the sub-pixel is a size of the sub-pixel along the row direction.

According to some embodiments of the present disclosure, there is provided a display device, comprising:

a pixel array, comprising a plurality of pixel rows, each pixel row including repetitive units sequentially arranged along a row direction, each repetitive unit including three sub-pixels of different colors, wherein, odd-numbered pixel rows and even-numbered pixel rows are alternately arranged along a column direction; in an odd-numbered pixel row and an even-numbered pixel row adjacent to each other, a minimum distance between center points of sub-pixels of a same color along the row direction is equal to 1 to 1.5 times a width of the sub-pixel, and the width of the sub-pixel is a size of the sub-pixel along the row direction; and a light splitting device, configured to form light shielding bars arranged at intervals in a 3D mode, to respectively project light for displaying a left-eye image and light for displaying a right-eye image into a left eye and a right eye of a viewer.

According to some embodiments of the present disclosure, there is provided a display method of a display device, the display device comprising: a pixel array, comprising a plurality of pixel rows, each pixel row including repetitive units sequentially arranged along a row direction, each repetitive unit including three sub-pixels of different colors, wherein, odd-numbered pixel rows and even-numbered pixel rows are alternately arranged along a column direction; in an odd-numbered pixel row and an even-numbered pixel row adjacent to each other, a minimum distance between center points of sub-pixels of a same color along the row direction is equal to 1 to 1.5 times a width of the sub-pixel, and the width of the sub-pixel is a size of the sub-pixel along the row direction; and a light splitting device, configured to form light shielding bars arranged at intervals in a 3D mode, to respectively project light for displaying a left-eye image and light for displaying a right-eye image into a left eye and a right eye of a viewer, wherein, in the 3D mode, two sub-pixels in one of the odd-numbered pixel row and the even-numbered pixel row adjacent to each other and one sub-pixel, in the other of the odd-numbered pixel row and the even-numbered pixel row adjacent to each other, which is adjacent to the two sub-pixels compose a pixel, the three sub-pixels in the pixel have different colors, pixels are arranged along the column direction to form a plurality of pixel columns, adjacent pixel columns are separated from each other by at least one sub-pixel, the adjacent pixel columns are respectively used for displaying the left-eye image and the right-eye image, and sub-pixels located between the adjacent pixel columns is used for displaying a black color, the method comprising:

detecting an eyeball position of a viewer, and calculating a first distance D1 for which the eyeball position moves in a row direction;

calculating a second distance D2 corresponding to a width of the pixel, according to the first distance D1 for which the eyeball position moves;

dividing the second distance D2 by ½ of width of sub-pixel and rounding to obtain a multiple, moving the pixel column so that a center line thereof moves in the row direction along a direction, opposite to a direction along which the eyeball moves, for a distance of the ½ of width of sub-pixel multiplied by the multiple.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION in order to make objects, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the disclosure. Based on the described embodiments of the disclosure, those ordinarily skilled in the art can obtain other embodiment(s), without any inventive work, which should be within the protective scope of the disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is a described object is changed, the relative positional relationship may also be correspondingly changed.

Embodiments of the present disclosure provide a pixel array, a display device comprising the pixel array and a display method used in the display device.

According to the embodiments of the present disclosure, there is provided a three-dimensional (3D) solution, to achieve a purpose of comprehensively upgrading 3D experience. For example, in the pixel array according to an embodiment of the present disclosure, a high resolution may be achieved by 2D pixel rendering; and in a 3D mode, 3D optical crosstalk can be mitigated by increasing a buffer sub-pixel. In addition, a position of the buffer sub-pixel may be combined with an eye tracking technology, which can move and extend a visual angle, and upgrade the 3D experience.

Figure 1:
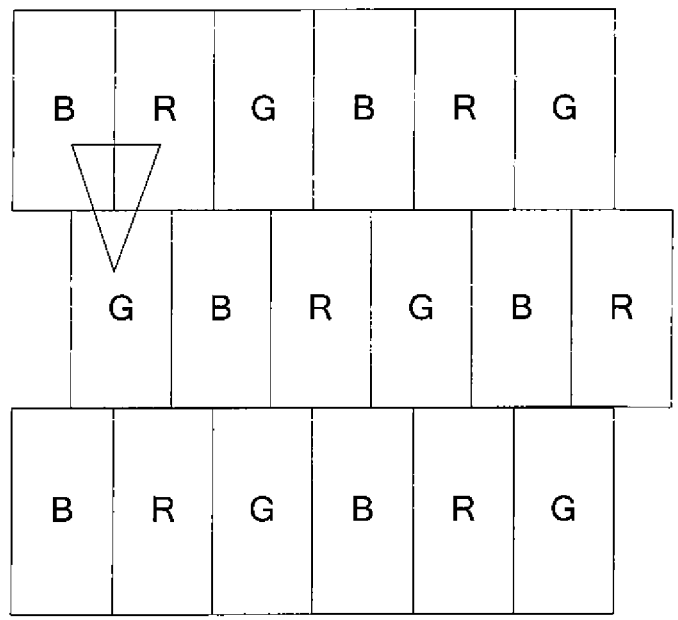
FIG. 1 illustrates a structural schematic diagram of a pixel array according to an embodiment of the present disclosure.

FIG. 1 illustrates a structural schematic diagram of a pixel array according to an embodiment of the present disclosure. It can be seen from FIG. 1 that, the pixel array comprises a plurality of pixel rows. Each pixel row includes repetitive units sequentially arranged along a row direction, and each repetitive unit includes three sub-pixels of different colors. In FIG. 1, the three sub-pixels of different colors are respectively a red sub-pixel R, a green sub-pixel G and a blue sub-pixel B. However, according to the embodiment of the present disclosure, it is not limited to the sub-pixels of these colors, and sub-pixels of other colors may be set according to needs. For example, the sub-pixels of the three colors may be a magenta sub-pixel, a cyan sub-pixel and a yellow sub-pixel.

In addition, for convenience of description, the plurality of pixel rows is divided into odd-numbered pixel rows and even-numbered pixel rows. It can be seen from FIG. 1 that, the odd-numbered pixel rows and the even-numbered pixel rows are alternately arranged along a column direction to form the pixel array. In an odd-numbered pixel row and an even-numbered pixel row adjacent to each other, a minimum distance between center points of sub-pixels of a same color along the row direction may be equal to 1 to 1.5 times a width of the sub-pixel. Here, the width of the sub-pixel is a size of the sub-pixel along the row direction.

In a pixel structure illustrated in FIG. 1, in a 2D display mode, in two adjacent pixel rows, two sub-pixels in one pixel row and one sub-pixel in the other pixel row compose one pixel, colors of the three sub-pixels in each pixel are different from each other. For example, two sub-pixels in the odd-numbered pixel row and one sub-pixel in the even-numbered pixel row may compose one pixel. As illustrated in FIG. 1, if the three sub-pixels are connected together, then they compose an inverted-triangle pixel structure. For example, one sub-pixel in the odd-numbered pixel row and two sub-pixels in the even-numbered pixel row may compose one pixel; and if the three sub-pixels are connected together, then they compose a triangle pixel structure. In addition, the inverted-triangle pixel and the triangle pixel adjacent to each other may share two sub-pixels therebetween. For example, in FIG. 1, a second sub-pixel R in a first row, and a first sub-pixel G and a second sub-pixel B in a second row can compose a pixel, the pixel share two sub-pixels R and G with the pixel illustrated by a triangle in FIG. 1. Thus, the resolution in the 2D display mode can be improved by the rendering technology.

In a 3D display mode, the inverted-triangle pixel and the triangle pixel as described above can also be used for image display. Furthermore, in order to avoid crosstalk, a buffer sub-pixel for displaying a black color may be arranged between adjacent pixels. In addition, for the pixel structure for displaying and the buffer sub-pixel between the pixel structures, they can move with movement of an eyeball of a viewer, so as to implement eye tracking, and upgrade 3D experience. Hereinafter, more detailed description will be provided according to the embodiments of the present disclosure.

First Embodiment

Figure 2:
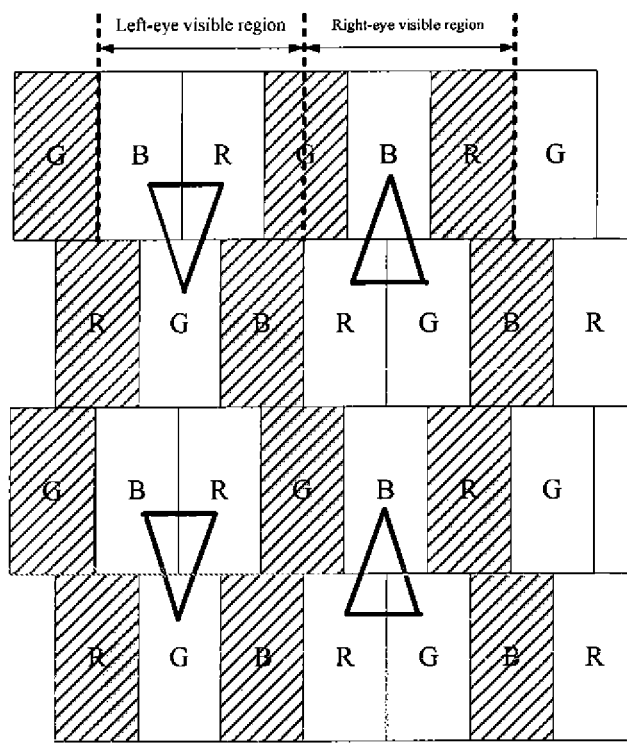
FIG. 2 is a structural schematic diagram of a pixel array according to a first embodiment.

As illustrated in FIG. 2, a basic structure of arrangement of sub-pixels of the pixel array is the same as that in FIG. 1. However, in the 3D display mode, composition of the pixels is different from that in the 2D display mode. Two sub-pixels in one of the odd-numbered pixel row and the even-numbered pixel row adjacent to each other and one sub-pixel, in the other of the odd-numbered pixel row and the even-numbered pixel row adjacent to each other, which is adjacent to the two sub-pixels compose a pixel. The three sub-pixels in each pixel have different colors, and the pixels are arranged along the column direction to form a plurality of pixel columns.

In two adjacent pixels in the row direction, one pixel includes two sub-pixels in an odd-numbered pixel row and one sub-pixel in an even-numbered pixel row, that is, an inverted-triangle pixel is formed, as illustrated in a pixel column on the left in FIG. 2; the other pixel includes one sub-pixel in the odd-numbered pixel row and two sub-pixels in the even-numbered pixel row, that is, a triangle pixel, as illustrated in a pixel column on the right in FIG. 2. Adjacent pixel columns are separated from each other by one sub-pixel.

It should be noted that, although it is illustrated with an example that the pixel columns are separated from each other by one sub-pixel, yet they can be separated from each other by more than one sub-pixel according to an embodiment of the present disclosure. However, considered from a point of view of improving pixel density, preferably, two adjacent pixels in the row direction are separated from each other by only one sub-pixel. The sub-pixel is used for displaying a black buffer sub-pixel in the 3D mode, to avoid crosstalk between the left-eye image and the right-eye image.

The adjacent pixel columns are respectively used for displaying the left-eye image and the right-eye image, while the sub-pixel between the adjacent pixel columns displays a black color so as to be buffer sub-pixels. It can be seen from FIG. 2 that, pixels on the left are used for displaying the left-eye image, and pixels on the right are used for displaying the right-eye image, to correspond to a left-eye visible region and a right-eye visible region.

For display in the above-described 3D mode, part of pixels are not used for displaying an image but for buffer sub-pixels. For the number of sub-pixels occupied by each pixel in the row direction, it refers to a sum of the number of sub-pixels which are used by the pixel itself for displaying and the number of the buffer sub-pixels allocated thereto. As illustrated in FIG. 2, a left-eye pixel occupies the sub-pixels B and R as well as half of the sub-pixel G in the first row, and a right-eye pixel occupies half of the sub-pixel G and the sub-pixels B and R in the first row. Thus, the two adjacent pixels occupy a total of 5 sub-pixels, and therefore, it is equivalent that one pixel occupies a width of 2.5 sub-pixels.

In the above-described pixel arrangement structure, a ratio of a size of each sub-pixel along the row direction to a size thereof along the column direction is 1:1 to 1:3, and preferably, the ratio is 2:5. Such pixels displayed horizontally and vertically can be evenly distributed.

According to an embodiment of the present disclosure, there is further provided a display device comprising the pixel array and the light splitting device as described above in conjunction with FIG. 2. The light splitting device is configured to form light shielding bars arranged at intervals in a 3D mode, to respectively project light for displaying a left-eye image and light for displaying a right-eye image into the left eye and the right eye of a viewer. For example, the light splitting device may be a liquid crystal grating, an electrochromic grating or other gratings, which can, by controlling a liquid crystal state, implement light shielding in a partial region to form the light shielding bar and implement light transmission in other region to form a light transmitting region, or may be light-transmissive in an entire region. Thus, such a light splitting device may be switched between the 2D mode and the 3D mode, to implement that the display device is switched between 2D display and 3D display.

Figure 3:
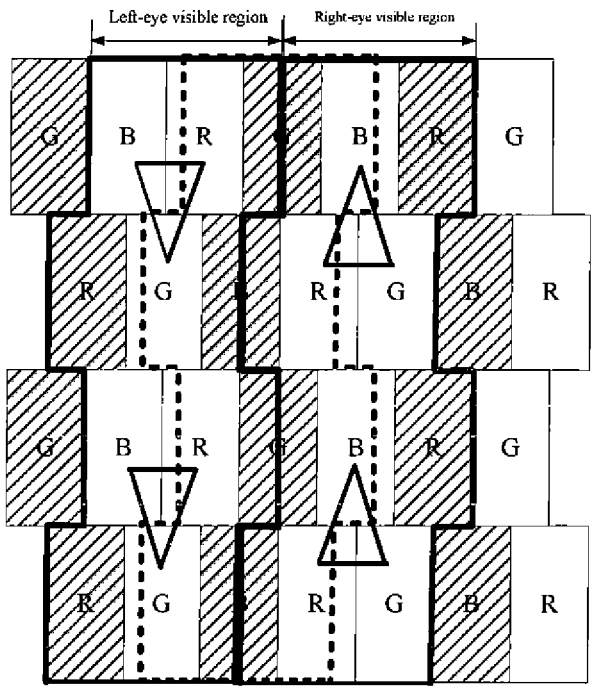
FIG. 3 illustrates a schematic diagram of a light shielding bar according to some embodiments of the present disclosure.

FIG. 3 illustrates a schematic diagram of a light shielding bar according to some embodiments of the present disclosure. As illustrated in FIG. 3, a position of a dotted line box represents a position where the light shielding bar is located, and a position of a thick solid line box represents a position where a pixel region is shielded when the viewer is watching. The light shielding bar includes a first portion P1 corresponding to the odd-numbered pixel row and a second portion P2 corresponding to the even-numbered pixel row, and a size of the first portion P1 and the second portion P2 along the row direction is equal to 2.5 times the width of the sub-pixel. For example, they are staggered from each other along the row direction for a distance of half of the width of the sub-pixel. The first portion and the second portion may not be limited to the above-described width and the distance for staggering; as long as the light for displaying the left-eye image enters the left eye and the light for displaying the right-eye image enters the right eye, the above-described size can be suitably adjusted.

Although it is illustrated with the size of the first portion P1 and the second portion P2 along the row direction being equal to 2.5 times the width of the sub-pixel as an example in FIG. 3, yet the above-described size of the first portion P1 and the second portion P2 as described above in the light shielding bar according to the embodiments of the present disclosure may be 2 to 3 times the width of the sub-pixel.

The first portion P1 and the second portion P2 at least shield a pixel in the odd-numbered pixel column or the even-numbered pixel column which displays image light, but does not shield a pixel in the adjacent pixel column which displays the image light.

Figure 4:
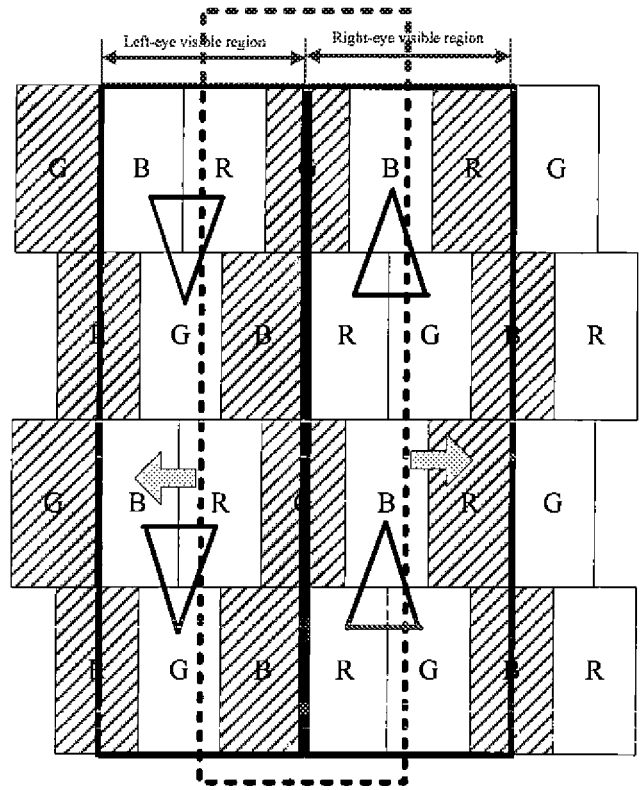
FIG. 4 illustrates a schematic diagram of a light shielding bar according to some other embodiments of the present disclosure.

FIG. 4 illustrates a schematic diagram of a light shielding bar according to some other embodiments of the present disclosure. The light shielding bar is a strip light shielding bar extending along the column direction. As illustrated in FIG. 4, a position of a dotted line box represents a position where the light shielding bar is located, and a position of a thick solid line box represents a position where a pixel region is shielded when the viewer is watching. For example, a position of the light shielding bar is arranged so that the light for displaying the left-eye image enters the left eye and the light for displaying the right-eye image enters the right eye. For example, the light shielding bar is arranged between center lines of the adjacent pixel columns which extend along the column direction. However, according to the embodiment of the present disclosure, it is not limited thereto, for example, it can be 2 to 3 times the width of the sub-pixel. Of course, other suitable positions and widths may also be used, as long as the grating can respectively shield a right-eye pixel region and a left-eye pixel region when viewed with the left eye and the right eye.

For example, in the display device according to the embodiment of the present disclosure, an aperture ratio of the above-described light splitting device may be 40% to 60%, e.g., 50%. The aperture ratio refers to a percentage of a light transmitting part occupying an entire area of the light splitting device. Such an aperture ratio can accommodate a maximum process margin.

Furthermore, the above-described display device may upgrade the 3D experience in combination with the eye tracking technology. For the eye tracking technology, it correspondingly changes the display mode according to movement of the eyeball during 3D display, which can thus move and extend the visual angle. The movement of the eyeball position may be obtained by cameras, or may be obtained by using any other method for obtaining the eyeball position known in the art, and therefore, contents of obtaining or detecting the movement of the eyeball position are no longer described in detail here.

According to the embodiment of the present disclosure, a position of the buffer sub-pixel moves according to the movement of the eyeball position, and correspondingly the pixel for displaying will also move.

For example, a display method according to the embodiment of the present disclosure may comprise steps of:

detecting an eyeball position of a viewer, and calculating a first distance D1 for which the eyeball position moves in a row direction;

calculating a second distance D2 corresponding to a width of the pixel, according to the first distance D1 for which the eyeball position moves; and every time when the second distance D2 exceeds the ½ of width of sub-pixel, the pixel column is moved so that a center line thereof moves in the row direction along a direction, opposite to a direction along which the eyeball moves, for a distance of the ½ of width of sub-pixel. That is to say, the second distance D2 is divided by the ½ of width of sub-pixel, and rounded to obtain a multiple, the pixel column is moved so that the center line thereof moves in the row direction along the direction, opposite to the direction along which the eyeball moves, for the distance of the ½ of width of sub-pixel multiplied by the multiple.

As described above, an average width of one pixel is equivalent to a width of 2.5 sub-pixels. The above-described D2 can be calculated by a formula as follows: D2=D1*the width of sub-pixel*2.5/a pupil distance of the viewer.

Figure 5A:
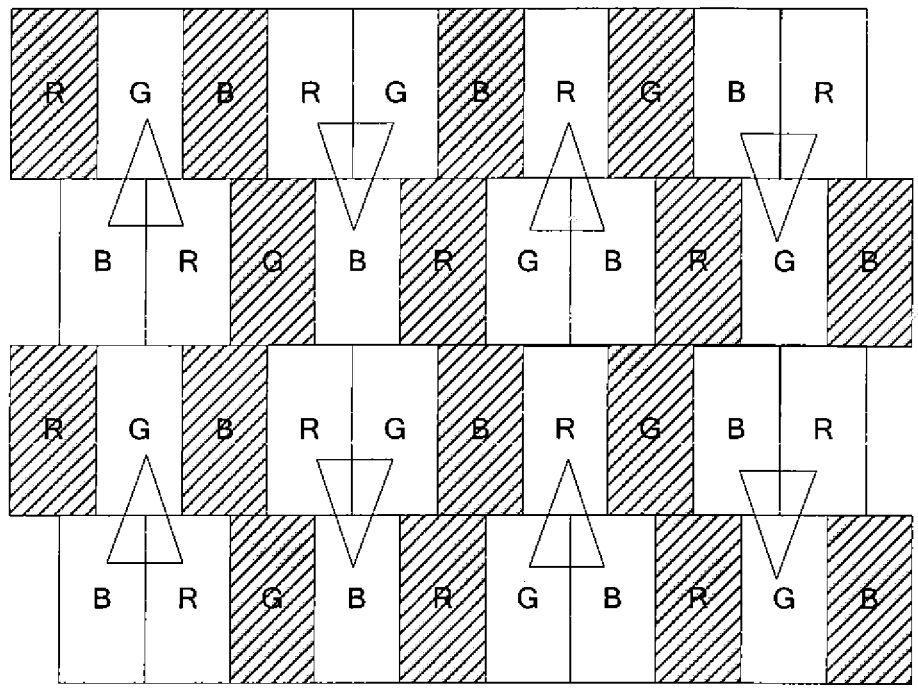
FIGS. 5(a) to 5(c) illustrate schematic diagrams of an eye tracking method of a display device according to the first embodiment.
Figure 5B:
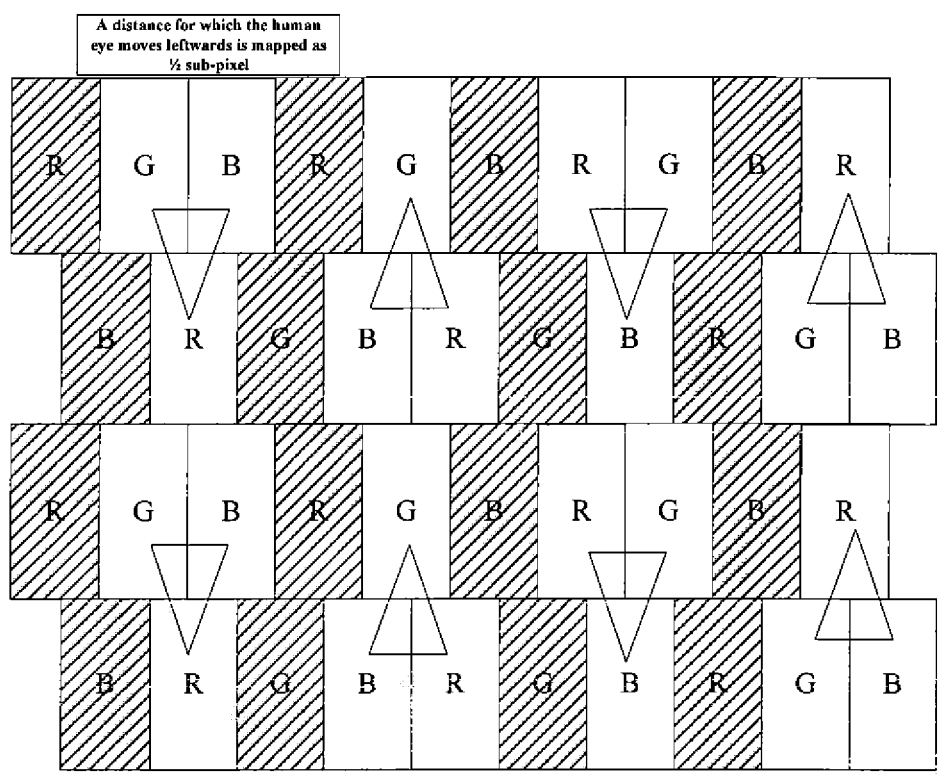
Figure 5C:
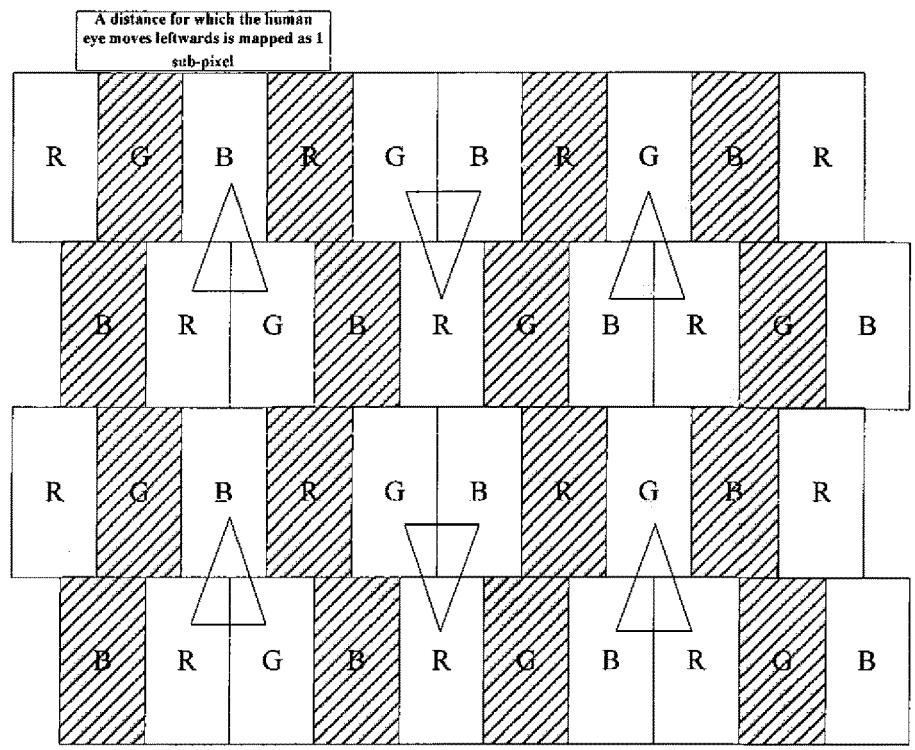

FIGS. 5(a) to 5(c) illustrate schematic diagrams of an eye tracking method of a display device according to the first embodiment. FIG. 5(a) is a schematic diagram of a pixel structure in an initial state. FIG. 5(b) is a schematic diagram of a pixel structure when the second distance D2 is ½ sub-pixel leftwards caused by movement of the eyeball. FIG. 5(c) is a schematic diagram of a pixel structure when the second distance D2 is 1 sub-pixel leftwards caused by the movement of the eyeball. For example, as illustrated in FIG. 5(b), leftward movement of the eyeball corresponds to the ½ of width of sub-pixel (D2), then the pixel moves rightwards for the ½ of width of sub-pixel, and at the same time, the buffer sub-pixel is adjusted accordingly. In addition, when the pixel moves leftwards for the ½ of width of sub-pixel, an inverted-triangle pixel is converted into a triangle pixel, and a triangle pixel is converted into an inverted-triangle pixel. As illustrated in FIG. 5(c), the leftward movement of the eyeball corresponds to the width of 1 sub-pixel (D2), then the pixel moves rightwards for the width of 1 sub-pixel, and at the same time, the buffer sub-pixel is adjusted accordingly. When the pixel moves rightwards for an integer multiple of the width of the sub-pixel, a shape of the pixel will not change, for example, the inverted-triangle pixel is still the inverted-triangle pixel, and the triangle pixel is still the triangle pixel.

As described above, it can be known that, when the pixel moves for an odd-numbered multiple of the ½ of width of sub-pixel, the shape of the pixel will change, an inverted-triangle pixel will be converted into a triangle pixel, and a triangle pixel will be converted into an inverted-triangle pixel. When the pixel moves for an even-numbered multiple of the ½ of width of sub-pixel, the shape of the pixel will not change, the inverted-triangle pixel is still the inverted-triangle pixel, and the triangle pixel is still the triangle pixel.

According to the above-described embodiment, when the pixel for displaying and the buffer sub-pixel between the pixels move according to the movement of the eyeball, the viewing angle can be moved and extended, so as to upgrade the 3D experience.

Second Embodiment

Figure 6:
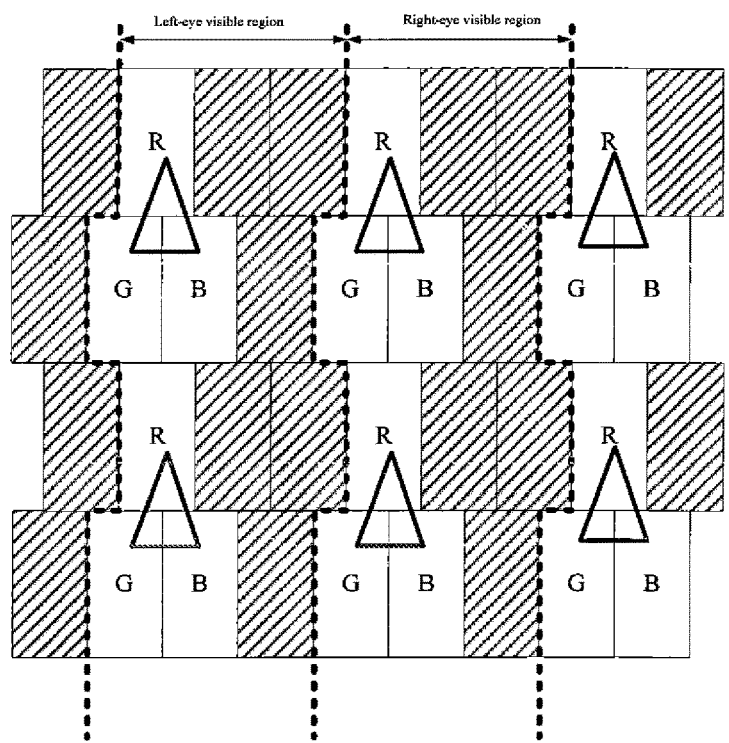
FIG. 6 is a structural schematic diagram of a pixel array according to a second embodiment.

As illustrated in FIG. 6, two sub-pixels in one of an odd-numbered pixel row and an even-numbered pixel row adjacent to each other and one sub-pixel, in the other of the odd-numbered pixel row and the even-numbered pixel row adjacent to each other, which is adjacent to the two sub-pixels compose a pixel, the three sub-pixels in the pixel have different colors, and the pixels are arranged along the column direction to form a plurality of pixel columns.

As illustrated in FIG. 6, in two adjacent pixels in the row direction, one pixel includes two sub-pixels in an odd-numbered pixel row and one sub-pixel in an even-numbered pixel row, and the other pixel in the two adjacent pixels includes two sub-pixels in the odd-numbered pixel row and one sub-pixel in the even-numbered pixel row. Thus, both the adjacent pixels in the row direction are triangle pixels. However, the structure according to the embodiment of the present disclosure is not limited thereto, and it may also be as follows: in two adjacent pixels in the row direction, one pixel includes one sub-pixel in an odd-numbered pixel row and two sub-pixels in an even-numbered pixel row, and the other pixel in the two adjacent pixels includes one sub-pixel in the odd-numbered pixel row and two sub-pixels in the even-numbered pixel row.

In the two adjacent pixels, portions having two sub-pixels in the row direction are separated by one sub-pixel, and portions having one sub-pixel in the row direction are separated by two sub-pixels. However, the embodiment of the present disclosure is not limited thereto, and it can also be separated by more sub-pixels. However, considered from the point of view of improving pixel density, preferably, in a case of the structure of this embodiment, the portions having two sub-pixels in the row direction are separated by one sub-pixel, and the portions having one sub-pixel in the row direction are separated by two sub-pixels.

The adjacent pixel columns are respectively used for displaying the left-eye image and the right-eye image, while the sub-pixel between the adjacent pixel columns displays a black color so as to be buffer sub-pixels. For display in the above-described 3D mode, part of pixels are not used for displaying an image but for buffer sub-pixels. For the number of sub-pixels occupied by each pixel in the row direction, it refers to a sum of the number of sub-pixels which are used by the pixel itself for displaying and the number of the buffer sub-pixels allocated thereto. As illustrated in FIG. 6, a left-eye pixel occupies 3 sub-pixels in the first row, and a right-eye pixel occupies 3 sub-pixels in the first row. Thus, the two adjacent pixels occupy a total of 6 sub-pixels, and therefore, it is equivalent that each pixel occupies a width of 3 sub-pixels.

In the above-described pixel arrangement structure, a ratio of a size of each sub-pixel along the row direction to a size thereof along the column direction is 1:3. Such pixels displayed horizontally and vertically can be evenly distributed.

According to an embodiment of the present disclosure, there is further provided a display device comprising the pixel array and the light splitting device as described above in conjunction with FIG. 6. The light splitting device is configured to form light shielding bars arranged at intervals in a 3D mode, to respectively project light for displaying a left-eye image and light for displaying a right-eye image into the left eye and the right eye of a viewer. For example, the light splitting device may be a liquid crystal grating, an electrochromic grating or other gratings, which can, by controlling a liquid crystal state, implement light shielding in a partial region to form the light shielding bar and implement light transmission in other region to form a light transmitting region, or may be light-transmissive in an entire region. Thus, such a light splitting device may be switched between the 2D mode and the 3D mode, to implement that the display device is switched between 2D display and 3D display.

Figure 7:
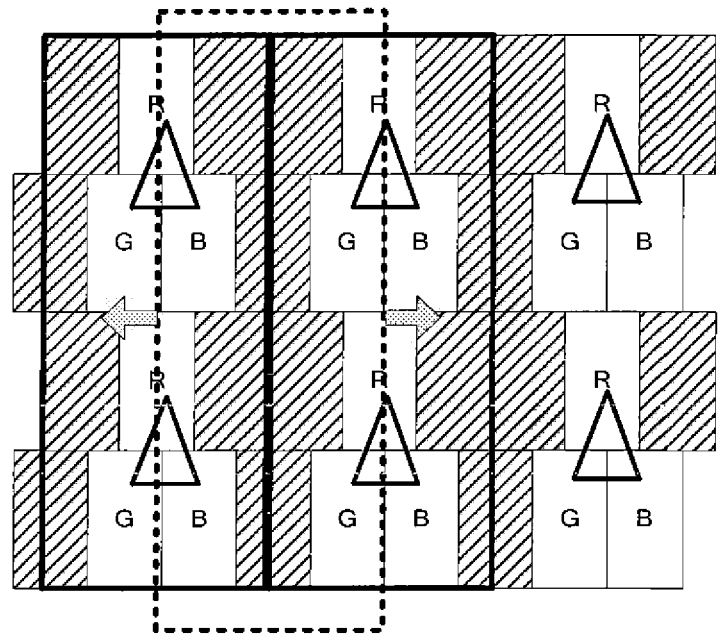
FIG. 7 illustrates a schematic diagram of a light shielding bar according to some embodiments of the present disclosure.

FIG. 7 illustrates a schematic diagram of a light shielding bar according to some embodiments of the present disclosure. As illustrated in FIG. 7, a position of a dotted line box represents a position where the light shielding bar is located, and a position of a thick solid line box represents a position where a pixel region is shielded when the viewer is watching respectively with the left eye and the right eye. The light shielding bar is a strip light shielding bar extending along the column direction. For example, a position of the light shielding bar is arranged so that the light for displaying the left-eye image enters the left eye and the light for displaying the right-eye image enters the right eye. For example, the light shielding bar is arranged between center lines of the adjacent pixel columns which extend along the column direction. For example, since in this embodiment it is equivalent that one pixel occupies a width of 3 sub-pixels, a width of the light shielding bar here may be set as the width of 3 sub-pixels. Of course, other suitable positions and widths may also be used, as long as the grating can respectively shield a right-eye pixel region and a left-eye pixel region when viewed with the left eye and the right eye.

For example, in the display device according to the embodiment of the present disclosure, an aperture ratio of the above-described light splitting device may be 33.3% to 66.7%, e.g., 50%. Such an aperture ratio can accommodate a maximum process margin.

Furthermore, the above-described display device may upgrade the 3D experience in combination with the eye tracking technology. According to the embodiment of the present disclosure, a position of the buffer sub-pixel moves according to the movement of the eyeball position, and the pixel displayed correspondingly will also move.

For example, a display method according to the embodiment of the present disclosure may comprise steps of:

detecting an eyeball position of a viewer, and calculating a first distance D1 for which the eyeball position moves in a row direction;

calculating a second distance D2 corresponding to a width of the pixel, according to the first distance D1 for which the eyeball position moves; and every time when the second distance D2 exceeds the ½ of width of sub-pixel, the pixel column is moved so that a center line thereof moves in the row direction along a direction, opposite to a direction along which the eyeball moves, for a distance of the ½ of width of sub-pixel. That is to say, the second distance D2 is divided by the ½ of width of sub-pixel, and rounded to obtain a multiple, the pixel column is moved so that the center line thereof moves in the row direction along the direction, opposite to the direction along which the eyeball moves, for the distance of the ½ of width of sub-pixel multiplied by the multiple.

As described above, an average width of one pixel is equivalent to a width of 3 sub-pixels. The above-described D2 can be calculated by a formula as follows: D2=D1*the width of sub-pixel*3/a pupil distance of the viewer.

Figure 8A:
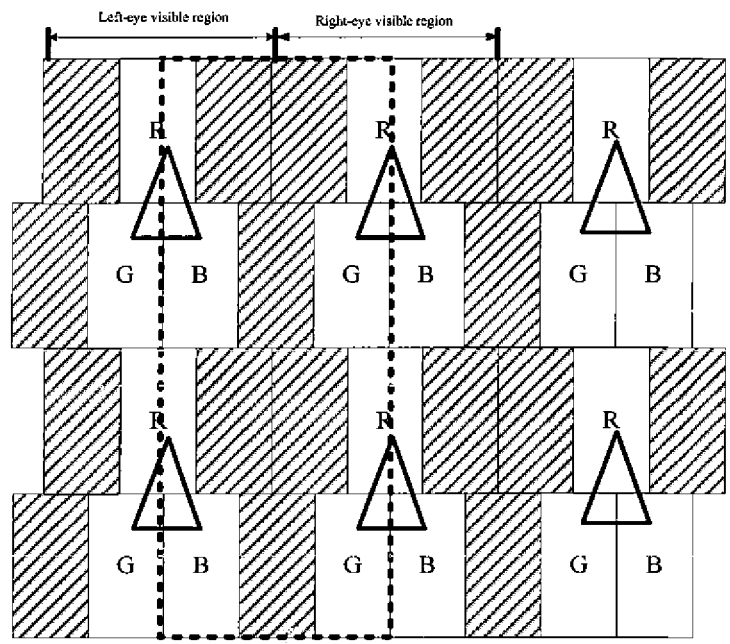
FIGS. 8(a) to 8(b) illustrate schematic diagrams of an eye tracking method of a display device according to the second embodiment.
Figure 8B:
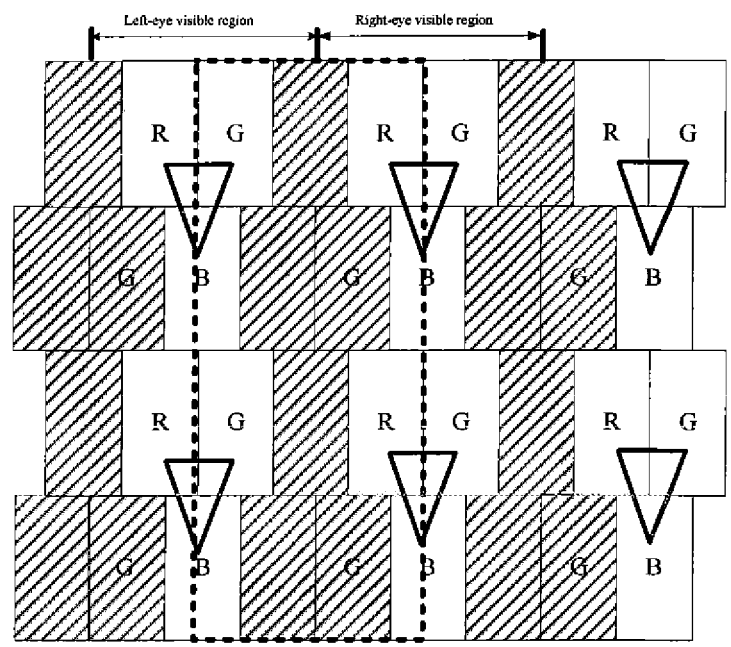

FIGS. 8(*a*) to 8(*b*) illustrate schematic diagrams of an eye tracking method of a display device according to the second embodiment. FIG. 8(*a*) is a schematic diagram of a pixel structure in an initial state. FIG. 8(*b*) is a schematic diagram of a pixel structure when the second distance D2 is ½ sub-pixel leftwards caused by movement of the eyeball. For example, as illustrated in FIG. 8(*b*), leftward movement of the eyeball corresponds to the ½ of width of sub-pixel (D2), then the pixel moves rightwards for the ½ of width of sub-pixel, and at the same time, the buffer sub-pixel is adjusted accordingly. In addition, when the pixel moves leftwards for the ½ of width of sub-pixel, an inverted-triangle pixel is converted into a triangle pixel, and a triangle pixel is converted into an inverted-triangle pixel.

As in the first embodiment, when the pixel moves for an odd-numbered multiple of the ½ of width of sub-pixel, the shape of the pixel will change, an inverted-triangle pixel will be converted into a triangle pixel, and a triangle pixel will be converted into an inverted-triangle pixel. When the pixel moves for an even-numbered multiple of the ½ of width of sub-pixel, the shape of the pixel will not change, the inverted-triangle pixel is still the inverted-triangle pixel, and the triangle pixel is still the triangle pixel.

In the first and second embodiments, both moving the pixel and moving the buffer sub-pixel are involved. Actually, both the sub-pixel used for displaying and the buffer sub-pixel are implemented by inputting different control signals. Thus, the moving the pixel column can be implemented by controlling the signal applied to each sub-pixel. It is illustrated with the third sub-pixel (B) in the first row of the pixel array in FIGS. 5(*a*) and 5(*b*) as an example: in an initial position, the sub-pixel is used as a buffering sub-pixel, and at this time, the sub-pixel displays a black color so as to be buffer sub-pixels; and when the eyeball moves leftwards, the sub-pixel is changed to a sub-pixel used for displaying, which is a part of the pixel. For other sub-pixels, similar changes can be performed. In this mode, the movement of the pixel and the buffer sub-pixel is implemented by outputting different control signals to respective sub-pixels.

In addition, it should be noted that, in the above-described formula for calculating the second distance D2=D1*the width of sub-pixel*X/a pupil distance of the viewer, where "X" is actually the number of sub-pixels occupied by each pixel in the row direction. For example, it is illustrated in both the first embodiment and the second embodiment above with a preferable case where the number of the sub-pixels used for buffering is a minimum; however, the embodiment of the present disclosure can be applied to a case of a larger number of buffer sub-pixels.

In the embodiment as described above, the inverted-triangle pixel structure and the triangle pixel structure can be interchanged. For example, in a position where an inverted-triangle pixel is originally formed, a triangle pixel can be formed, and in a position where a triangle pixel is originally formed, an inverted-triangle pixel can be formed. It is not particularly limited according to the embodiment of the present disclosure.

Moreover, it should be noted that, the buffer sub-pixel is arranged between the adjacent pixel columns in order to avoid crosstalk. However, not every two adjacent pixel columns must include a buffer sub-pixel therebetween. In order to improve pixel density, some adjacent pixel columns may not have a buffer sub-pixel arranged therebetween.

For the above-described pupil distance of the viewer, an actual pupil distance of the viewer can be directly obtained through an image analysis technology. However, since the pupil distances of most people are very similar, a fixed value may also be preset, for example, 65 mm.

For the first embodiment and the second embodiment as described above, the pixel column is moved so that the center line thereof moves in the row direction along the direction, opposite to the direction along which the eyeball moves, for the distance of the ½ of width of sub-pixel multiplied by the multiple. When the multiple is odd, the pixel has the center line moved and the shape changed at the same time, for example, the movement renders the pixel composed by two sub-pixels in the odd-numbered pixel row and one sub-pixel in the even-numbered pixel row changed to the pixel composed by one sub-pixel in the odd-numbered pixel row and two sub-pixels in the even-numbered pixel row, or the pixel composed by one sub-pixel in the odd-numbered pixel row and two sub-pixels in the even-numbered pixel row changed to the pixel composed by two sub-pixels in the odd-numbered pixel row and one sub-pixel in the even-numbered pixel row; and when the multiple is even, the pixel has the center line moved but the shape unchanged. Here, the shape of the pixel refers to the inverted-triangle structure or the triangle structure. The inverted-triangle pixel is still the inverted-triangle pixel after moving, and the triangle pixel is still the triangle pixel after moving, that is to say, the movement renders the pixel to translate along the row direction for the distance of the ½ of width of sub-pixel multiplied by the multiple.

The above are only specific embodiments of the present application, but the scope of the embodiment of the invention is not limited thereto, and any skilled in the art, within the technical scope disclosed by the embodiment of the invention, can easily think of variations or replacements, which should be covered within the protection scope of the embodiment of the invention.

The present application claims priority of Chinese Patent Application No. 201510065304.0 filed on Feb. 6, 2015, the disclosure of which is incorporated herein by reference in its entirety as part of the present application.

The invention claimed is:

1. A display device, comprising:
a pixel array, comprising a plurality of pixel rows, each pixel row including repetitive units sequentially arranged along a row direction, each repetitive unit including three sub-pixels of different colors, wherein, odd-numbered pixel rows and even-numbered pixel rows are alternately arranged along a column direction; in an odd-numbered pixel row and an even-numbered pixel row adjacent to each other, a minimum distance between center points of sub-pixels of a same color along the row direction is equal to 1 to 1.5 times a width of the sub-pixel, and the width of the sub-pixel is a size of the sub-pixel along the row direction; and
a light splitting device, configured to form light shielding bars arranged at intervals in a 3D mode, to respectively project light for displaying a left-eye image and light for displaying a right-eye image into a left eye and a right eye of a viewer,
wherein, in the 3D mode, two sub-pixels in one of the odd-numbered pixel row and the even-numbered pixel row adjacent to each other and one sub-pixel, in the other of the odd-numbered pixel row and the even-numbered pixel row adjacent to each other, which is adjacent to the two sub-pixels compose a pixel, the three sub-pixels in the pixel have different colors, pixels are arranged along the column direction to form a plurality of pixel columns, adjacent pixel columns are separated from each other by at least one sub-pixel, the adjacent pixel columns are respectively used for displaying the left-eye image and the right-eye image, and sub-pixels located between the adjacent pixel columns are used for displaying a black color.

2. The display device according to claim 1, wherein, the light splitting device is configured to be switched between a 2D mode and a 3D mode, and in the 2D mode, an entire region of the light splitting device is light-transmissive.

3. The display device according to claim 2, wherein, the light splitting device is a liquid crystal grating or an electrochromic grating.

4. The display device according to claim 1, wherein, in two adjacent pixels in the row direction, one pixel includes two sub-pixels in an odd-numbered pixel row and one sub-pixel in an even-numbered pixel row, and the other pixel in the two adjacent pixels includes one sub-pixel in the odd-numbered pixel row and two sub-pixels in the even-numbered pixel row, and adjacent pixel columns are separated from each other by one sub-pixel.

5. The display device according to claim 4, wherein, a ratio of a size of the sub-pixel along the row direction to a size thereof along a column direction is 1:1 to 1:3.

6. The display device according to claim 4, wherein, the light shielding bar includes a first portion corresponding to the odd-numbered pixel row and a second portion corresponding to the even-numbered pixel row, and the first portion and the second portion are staggered from each other in the row direction, so that light for displaying the left-eye image enters the left eye and light for displaying the right-eye image enters the right eye.

7. The display device according to claim 6, wherein, an aperture ratio of the light splitting device is 40% to 60%.

8. The display device according to claim 4, wherein, the light shielding bar is a strip light shielding bar extending along a column direction, and a position of the light shielding bar is arranged so that light for displaying the left-eye image enters the left eye and light for displaying the right-eye image enters the right eye.

9. The display device according to claim 8, wherein, the light shielding bar is arranged between center lines of the two adjacent pixel columns which extend along the column direction.

10. The display device according to claim 8, wherein, an aperture ratio of the light splitting device is 40% to 60%.

11. The display device according to 1, wherein, in two adjacent pixels in the row direction, one pixel includes two sub-pixels in an odd-numbered pixel row and one sub-pixel in an even-numbered pixel row, and the other pixel in the two adjacent pixels includes two sub-pixels in the odd-numbered pixel row and one sub-pixel in the even-numbered pixel row; or, in two adjacent pixels in the row direction, one pixel includes one sub-pixel in an odd-numbered pixel row and two sub-pixels in an even-numbered pixel row, and the other pixel in the two adjacent pixels includes one sub-pixel in the odd-numbered pixel row and two sub-pixels in the even-numbered pixel row, and in the two adjacent pixels, portions having two sub-pixels in the row direction are separated by one sub-pixel, and portions having one sub-pixel in the row direction are separated by two sub-pixels.

12. The display device according to claim 11, wherein, a ratio of a size of the sub-pixel along the row direction to a size thereof along a column direction is 1:3.

13. The display device according to claim 11, wherein, the light shielding bar is a strip light shielding bar extending along a column direction, and a position of the light shielding bar is arranged so that light for displaying the left-eye image enters the left eye and light for displaying the right-eye image enters the right eye.

14. The display device according to claim 13, wherein, the light shielding bar is arranged between center lines of the adjacent pixel columns which extend along the column direction.

15. The display device according to claim 13, wherein, an aperture ratio of the light splitting device is 33.3% to 66.7%.

16. A display method of a display device, the display device comprising: a pixel array, comprising a plurality of pixel rows, each pixel row including repetitive units sequentially arranged along a row direction, each repetitive unit including three sub-pixels of different colors, wherein, odd-numbered pixel rows and even-numbered pixel rows are alternately arranged along a column direction; in an odd-numbered pixel row and an even-numbered pixel row adjacent to each other, a minimum distance between center points of sub-pixels of a same color along the row direction is equal to 1 to 1.5 times a width of the sub-pixel, and the width of the sub-pixel is a size of the sub-pixel along the row direction; and a light splitting device, configured to form light shielding bars arranged at intervals in a 3D mode, to respectively project light for displaying a left-eye image and light for displaying a right-eye image into a left eye and a right eye of a viewer, wherein, in the 3D mode, two sub-pixels in one of the odd-numbered pixel row and the even-numbered pixel row adjacent to each other and one sub-pixel, in the other of the odd-numbered pixel row and the even-numbered pixel row adjacent to each other, which is adjacent to the two sub-pixels compose a pixel, the three sub-pixels in the pixel have different colors, pixels are arranged along the column direction to form a plurality of pixel columns, adjacent pixel columns are separated from each other by at least one sub-pixel, the adjacent pixel columns are respectively used for displaying the left-eye image and the right-eye image, and sub-pixels located between the adjacent pixel columns is used for displaying a black color, the method comprising:

detecting an eyeball position of a viewer, and calculating a first distance D1 for which the eyeball position moves in a row direction;

calculating a second distance D2 corresponding to a width of the pixel, according to the first distance D1 for which the eyeball position moves;

dividing the second distance D2 by ½ of width of sub-pixel and rounding to obtain a multiple, moving the pixel column so that a center line thereof moves in the row direction along a direction, opposite to a direction along which the eyeball moves, for a distance of the ½ of width of sub-pixel multiplied by the multiple.

17. The method according to claim 16, wherein, the second distance D2 is calculated by a formula as follows: D2=D1*the width of sub-pixel*X/a pupil distance of the viewer, where "X" is the number of sub-pixels occupied by each pixel in the row direction.

18. The method according to claim 16, wherein, the pixel composed by two sub-pixels in the odd-numbered pixel row and one sub-pixel in the even-numbered pixel row has a first shape, and the pixel composed by one sub-pixel in the odd-numbered pixel row and two sub-pixels in the even-numbered pixel row has a second shape, when the multiple is odd, the movement renders the pixel to change from the first shape to the second shape, or from the second shape to the first shape; and when the multiple is even, the pixel has the shape unchanged after moving.

19. The method according to claim 16, wherein, moving the pixel column is implemented by controlling a signal applied to each sub-pixel.

* * * * *